United States Patent [19]
Piber

[11] 3,987,265
[45] Oct. 19, 1976

[54] SNAP-IN ASSEMBLY FOR MOUNTING DEVICES IN A SUPPORT PANEL APERTURE

[75] Inventor: Earl T. Piber, Oconomowoc, Wis.

[73] Assignee: Cutler-Hammer, Inc., Milwaukee, Wis.

[22] Filed: Mar. 17, 1975

[21] Appl. No.: 558,922

[52] U.S. Cl. .............................. 200/296; 248/27.8; 200/153 G
[51] Int. Cl.² ........................................ H01H 9/02
[58] Field of Search ................ 200/153 G, 293, 296; 248/27 A; 339/126 RS, 128

[56] References Cited
UNITED STATES PATENTS

| | | | |
|---|---|---|---|
| 2,689,700 | 9/1954 | Drury | 200/296 |
| 3,102,173 | 8/1963 | Damon | 200/296 |
| 3,273,104 | 9/1966 | Krol | 339/128 |
| 3,299,227 | 1/1967 | Schaad | 200/296 |

FOREIGN PATENTS OR APPLICATIONS

| | | | |
|---|---|---|---|
| 1,938,775 | 2/1971 | Germany | 200/296 |

Primary Examiner—Gerald P. Tolin
Attorney, Agent, or Firm—Michael, Best & Friedrich

[57] ABSTRACT

The snap-in assembly includes a split or snap ring which is releasably held within an annular groove provided in the outer end portion of an elongated bushing, pivotally supporting an actuating lever of an electrical toggle switch, by a retainer including a sleeve or collar encircling and releasably engaging the snap ring. As the outer end portion of the bushing is inserted through the hole of a support panel during mounting, a portion of the retainer abuts the back of the panel and continued axial movement of the bushing relative to the retainer causes the snap ring to become disengaged from the sleeve or collar and move radially outwardly toward its normally expanded position where it overlies a front portion of the panel surrounding the mounting hole. The snap ring is held in tight engagement with the front of the panel by a backup spring which urges the bushing in an axial direction away from the backside of the panel.

14 Claims, 6 Drawing Figures

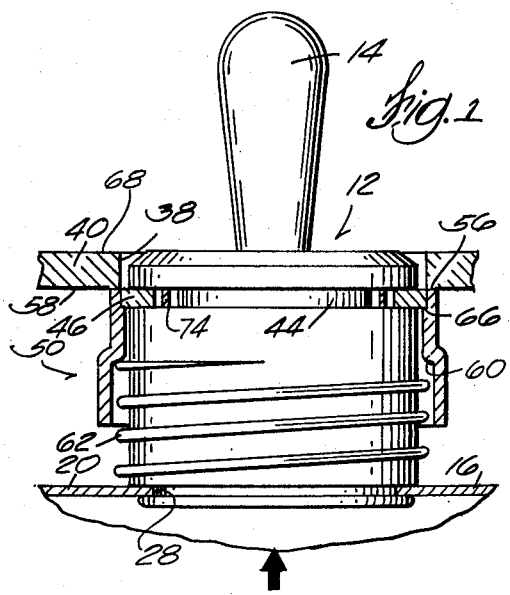
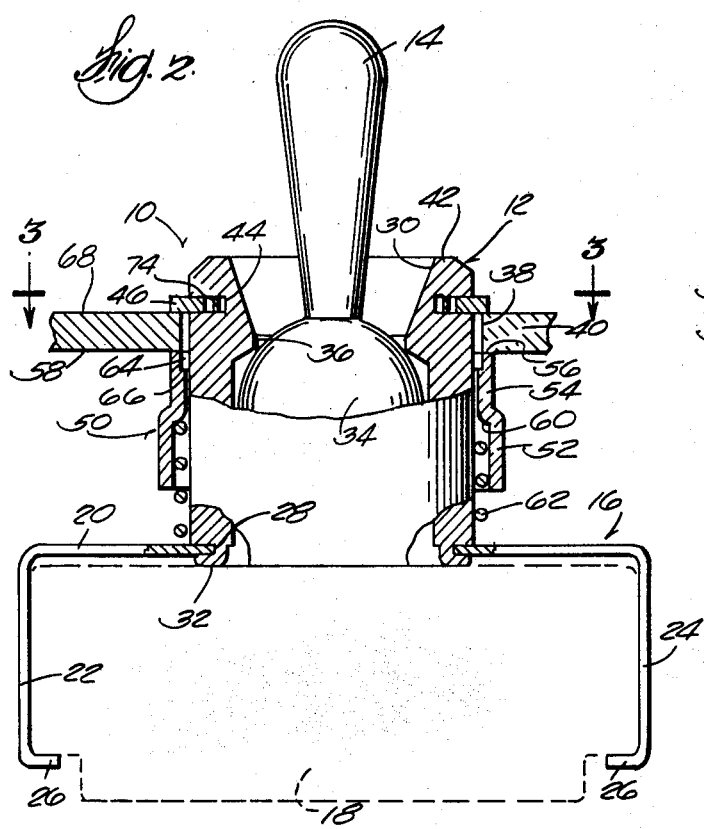
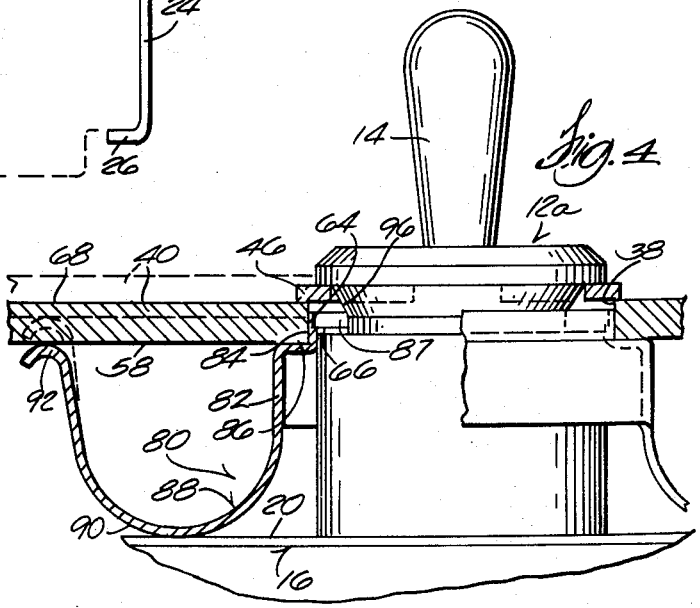
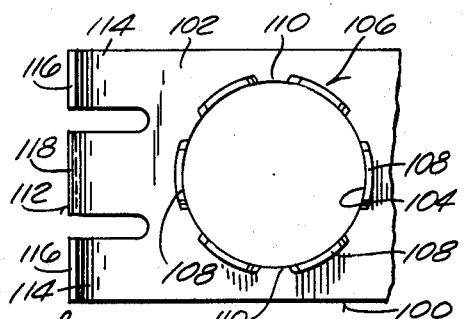
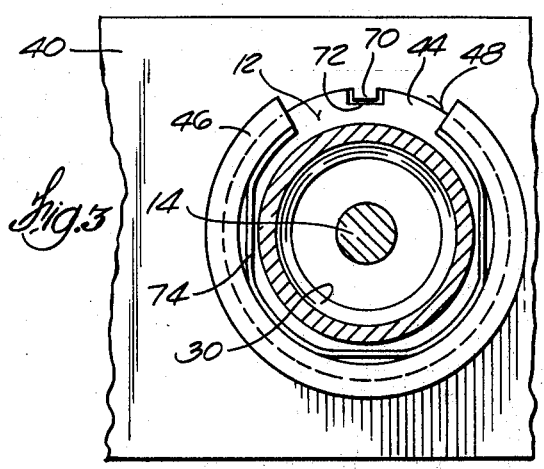
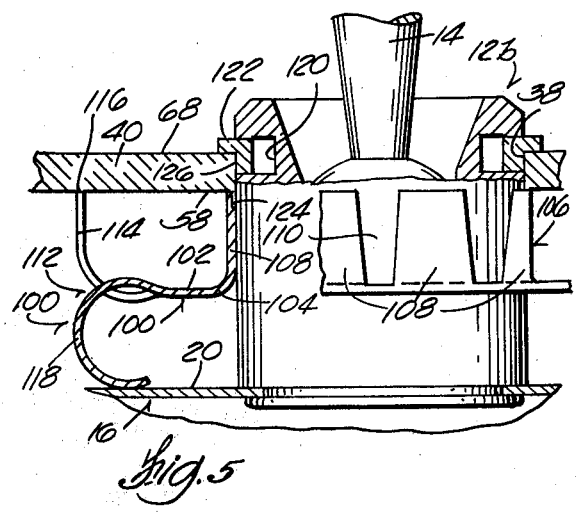

SNAP-IN ASSEMBLY FOR MOUNTING DEVICES IN A SUPPORT PANEL APERTURE

BACKGROUND OF THE INVENTION

The invention relates to push-in or snap-in mounting assemblies for mounting a device in a hole of a mounting panel and, more particularly, to such mounting assemblies adapted for use with electrical devices, such as a toggle switch or the like.

Push-in or snap-in mounting assemblies for mounting devices, such as electrical switches or other electrical components, in a hole provided in a bulkhead or support panel are known. Prior art snap-in mounting constructions, particularly for rectangular mounting holes, typically have used biased fingers or the like which grip the edges of the mounting hole when the device is pressed into the hole. Such prior devices are not always completely satisfactory for the snap-in mounting of the circular bushings of a toggle switch because the retention or holding strength provided thereby is relatively low, the mounting hole is not completely closed and/or the mount does not present a smooth and neat appearance at the front of the panel.

SUMMARY OF THE INVENTION

An object of the invention is to provide a snap-in mounting assembly which is particularly adaptable for an electrical switch or the like and is arranged to facilitate simple and quick installation into a mounting hole in a support panel without special tools.

Another object of the invention is to provide a snap-in mounting assembly for mounting a device, such as an electrical switch or the like, that can be inserted through a round mounting hole in a support panel from the back of the panel, has a high retaining strength after mounting and presents a smooth and neat appearance at the front of the panel.

A further object of the invention is to provide such a snap-in mounting assembly including means for automatically centering the mounted device within the support panel mounting hole.

Other objects, aspects and advantages of the invention will become apparent upon reviewing the following detailed description, the drawing and the appended claims.

The snap-in mounting assembly provided by the invention includes an elongated bushing having an outer end portion to be received in the aperture of a support panel on which the device is to be mounted, an annular groove in the outer end portion of the bushing, a split or snap ring which is disposed in the bushing groove and is radially compressible and expandable in the plane thereof within the groove between a normally expanded position where its outer dimension is greater than the inside dimension of the panel aperture and a radially inwardly compressed position where it can pass through the aperture, and a retaining means mounted for axial movement relative to the bushing and having a stepped portion for engaging and releasably holding the split ring pinched within the bushing groove prior to mounting so that it will pass freely through the panel hole.

Upon initial insertion of the bushing through the panel aperture, a portion of the retainer abuts the back of the panel at the rim of the hole so that continued axial movement of the bushing relative to the retainer causes the ring to slide out from the retainer and enter and pass through the hole and allows the split ring to return toward its normally expanded condition where at least a portion thereof overlies a front portion of the panel surrounding the mounting hole while the remainder remains within the groove. The mounting assembly also includes a biasing means which acts as a back-up spring to pull the ring in tight holding engagement with the front of the panel. Preferably, means are provided for automatically centering the ring with respect to the panel mounting hole so that it grips the panel equally around the mounting hole.

The snap-in mounting assembly of the invention is particularly adaptable for use with a toggle switch including an insulating base housing switch contacts and a switch frame mounted on the base with the bushing being mounted on the switch frame and pivotally supporting a toggle lever for actuating the switch contacts. In one embodiment, the retainer means includes a tubular sleeve encircling the bushing and having an outer end which abuts the back of the panel during mounting to permit the snap ring to be released. A coiled spring encircling the bushing with one end bearing against the sleeve and the other end bearing against the switch frame acts as the back-up spring. In another embodiment, both the ring-retaining and back-up spring functions are provided by an integral retainer-spring unit including a retainer section for releasably holding the snap ring in the bushing groove and a pair of opposed spring members integrally connected to the retainer section and having portions which bear against the top of the switch frame on opposite sides of the bushing and other portions which are adapted to bear against the back of the panel during mounting.

BRIEF DESCRIPTION OF THE DRAWING

FIG. 1 is an enlarged fragmentary, partially sectioned, side elevational view of a one hole, snap-in toggle switch embodying various of the features of the invention, shown in a position ready for installation from the rear of a bulkhead or support panel.

FIG. 2 is a veiw similar to FIG. 1 of the complete switch partly sectioned, but with the toggle switch shown installed in the mounting panel.

FIG. 3 is a fragmentary horizontal sectional view taken along the line 3—3 in FIG. 2 to show the centering spring.

FIG. 4 is a view similar to FIG. 1, illustrating an alternate construction for the bushing, the retainer sleeve and back-up spring with the toggle switch shown installed in the support panel.

FIG. 5 is a view similar to FIG. 1, illustrating another alternate construction of the snap ring, the retainer sleeve, and the back-up spring with the toggle switch assembly shown installed in the support panel.

FIG. 6 is a fragmentary top view, in reduced scale, of the retainer sleeve assembly of FIG. 5, shown in an unassembled condition prior to assembly on the bushing.

DESCRIPTION OF THE PREFERRED EMBODIMENTS

Illustrated in FIGS. 1–3 is a toggle switch assembly 10 embodying various of the features of the invention and including an elongated, generally cylindrical bushing 12, a toggle lever 14, a switch frame 16 and an insulating switch base 18 (illustrated schematically by dashed lines in FIG. 2) which houses electrical contacts (not shown). The switch base 18 and the toggle lever 14 are of conventional design so detailed illustration and description of the structural features thereof are not necessary for a full understanding of the invention. For example, the Miller U.S. Pat. No. 3,146,330, issued Aug. 25, 1964, illustrates a toggle switch including a switch base and a toggle lever arrangement adaptable for use in the invention.

The switch frame 16 has a generally rectangular top 20 and a pair of depending legs 22, 24 at each end. Located on the lower end of each leg 22 and 24 is one or more tabs 26 which, upon assembly of the switch frame 16 with the switch base 18, are bent over into engagement with the switch base to securely retain the switch frame on the switch base with the top 20 covering the open top of the switch base.

The bushing 12 is mounted on top of the switch frame 16 coaxially with a circular aperture 28 provided in the switch frame 16 (see FIG. 2). The bushing 12 has a central bore 30 for receiving the toggle lever 14. Located on the inner or lower end of the bushing 12 is a relatively thin annular extension 32 which, upon assembly of the bushing on the switch frame, is swaged into tight engagement with the underside of the switch frame to securely fasten the bushing to the switch frame. If desired, the bushing can be formed as an integral part of the switch frame, such as by molding these parts as a one-piece unit from a plastic material.

The toggle lever 14 has an external handle and extends through the bushing 12 with the lower end thereof extending into the switch base 18 for actuation of the electrical contacts, for example, as disclosed in the above-identified Miller Patent. The toggle lever 14 also includes an enlarged spherical portion 34 which bears against a constricted portion 36 of the bushing bore 30 to afford pivotal movement of the toggle lever relative to the bushing during actuating movement thereof.

The outer diameter of the bushing 12 is sized to permit the bushing to be loosely inserted through a circular mounting hole 38 in a bulkhead or support panel 40 on which the switch assembly 10 is to be mounted from the rear. Located near the upper or outer end 42 of the bushing 12 is an annular groove 44 for slidably receiving a split or snap ring 46 made from a relatively resilient material. In the specific construction illustrated in FIGS. 1-3, the snap ring 46 is generally in the form of a flat washer having a spacing 48. The snap ring 46 is radially compressible and expandable in its own plane within the bushing groove 44 between a radially inwardly compressed position where it can pass through the support panel mounting hole 38 (FIG. 1) and a normally expanded position where it partly overlies a front portion of the panel surrounding the mounting hole (FIG. 2) and partly remains within the groove.

Slidably mounted on the bushing 12 for releasably engaging and holding the snap ring 46 in the compressed position within the bushing groove 44 is a tubular retainer sleeve 50 including a radially offset first or inner portion 52 and a second or outer portion 54 of a reduced diameter and integrally connected to the inner portion 52 by a radially extending step or flange 60. The outer portion 54 terminates in an outer edge or rim 56 having an outside diameter somewhat larger than the diameter of the support panel mounting hole 38 so as to abut the back 58 of the support panel 40 when the switch assembly is mounted thereon as explained below. A coiled or helical back-up spring 62 encircles the bushing and is disposed between the inner sleeve portion 52 and the bushing 12 with one end bearing against the flange 60 and the other end bearing against the top of the switch frame 16 to bias the retainer sleeve 50 in an axial direction away from the switch frame.

To assemble the switch assembly 10 ready for mounting from the rear of the support panel 40 as shown in FIG. 1, the back-up spring 62 is dropped over the bushing 12, the retainer sleeve 50 is guided over the bushing 12 and then pushed toward the switch frame 16 to compress the back-up spring 62 and move the outer edge 56 of the retainer sleeve 50 past the bushing groove 44. The snap ring 46 is then placed over the upper end of the bushing 12 and compressed radially inwardly into the bushing groove 44 with a suitable tool. The retainer sleeve 50 is then released and the biasing force of the back-up spring 62 moves the outer portion 54 of the retainer sleeve 50 (upwardly as viewed in FIGS. 1 and 2) over the snap ring 46 to releasably hold it in a compressed condition within the bushing groove 44.

The upper portion 54 of the retainer sleeve 50 preferably is provided on its inner surface with an annular offset portion 64 for receiving the snap ring 46. The offset portion 64 has a radially extending ledge or shoulder 66 which is urged into engagement with the underside of the snap ring 46 by the back-up spring 60 to prevent the retainer sleeve 50 from slipping off of the bushing 12 prior to mounting.

If desired, the retainer sleeve 50 can be formed with a constant diameter, in which case the inner end is provided with a suitable abutment means for the outer end of the spring 62, such as a radially outwardly extending flange.

Upon inserting the bushing 12 through the support panel mounting hole 38 (in the direction of the arrow in FIG. 1), the outer edge 56 of the retainer sleeve 50 engages the back 58 of the support panel 40. Further axial movement of the bushing 12 relative to the retainer sleeve 50 causes the snap ring 46 to become disengaged from the retainer sleeve 50 and expand against the edge of the hole in the panel. Upon complete insertion of the outer end portion of the bushing through the mounting hole 38, the snap ring 46 is free to move radially outwardly to its normally expanded position. The biasing force of the back-up spring 62, acting through the retainer sleeve 50, pulls back and holds the snap ring 46 in tight holding engagement with the front 68 of the support panel 40 in the area surrounding the mounting hole 38.

For proper indexing of the switch assembly 10 and/or to prevent the switch assembly from rotating relative to the support panel 40 after mounting, the support panel mounting hole 38 normally is provided with a key or lug 70 which fits into an axially extending keyway 72 provided along one side of the bushing 12 (see FIG. 3).

Preferably, means are provided for centering the snap ring 46 with respect to the support panel mounting hole 38 so that it grips the support panel equally around the mounting hole. In the specific construction illustrated in FIGS. 1-3, such centering means comprises a generally U-shaped, thin spring spacer 74 which is disposed in the bushing groove 44 between the inner periphery of the snap ring 46 and the inner vertical wall of the groove 44. The spacer 74 cooperates with the inner wall of the bushing groove 44 to retain the snap ring 46 in evenly spaced relation thereto when both the snap ring and the spacer are in their normally expanded positions.

In the alternate construction illustrated in FIG. 4, wherein components like those in the construction illustrated in FIGS. 1–3 are identified with the same reference numerals, a modified form of the retainer sleeve and back-up spring is used. More specifically, these components are combined into a one-piece retainer-spring unit 80 made from a relatively resilient material, such as high carbon steel, and including a tubular sleeve portion 82, an annular, outwardly extending collar 84 radially offset inwardly from the sleeve portion 82, and a radially extending flange 86 integrally connecting the inner end of the collar 84 to the outer end of the sleeve portion 82. The collar 84 releasably engages and holds the snap ring 46 in the compressed position within the annular groove 87 of the bushing 12a prior to mounting in the same general manner as described above for the outer portion 54 of the retainer sleeve 50. The outer portion of the collar 84, like the outer portion 54 of the retainer sleeve 50 shown in FIGS. 1–3, preferably is provided on its inner surface with an annular offset portion 64 for receiving the snap ring 46. The outer dimension of the collar 84 is sized to fit inside the support panel mounting hole 38 and the flange 86 abuts the back 58 of support panel 40 when the bushing 12a is inserted through the mounting hole as shown in FIG. 4.

Extending integrally from the inner edge of the sleeve portion 82 of the retainer spring unit 80 is a pair of opposed, curved leaf spring members 88 (one shown in detail) which act as back-up springs. Each spring member 88 has an intermediate portion 90 which is convex with respect to the switch frame 16 and terminates in a hook-like portion 92 which is generally convex with respect to the back 58 of the mounting panel. The intermediate portions 90 bear against the top surface of the switch frame 16 and the hook-like portions 92 bear against the back 58 of the support panel 40 when the bushing 12a is inserted through the mounting hole 38.

To assemble the switch assembly ready for mounting, the retainer-spring unit 80 is placed over the bushing 12a and then pushed towards the switch frame 16. The intermediate portions 90 of the spring members 88 flex sufficiently to permit the outer edge of the collar 84 to be moved past the annular bushing groove 87. The snap ring 46 is installed in the bushing groove and compressed radially inwardly as described above. Upon releasing the retainer-spring unit 80, the biasing force of the spring members 88 moves the collar 84 over the snap ring 46 to releasably hold the snap ring in a compressed position. Similar to the embodiment illustrated in FIGS. 1–3, the radially extending ledge of the inner surface, annular offset portion 64 in the collar 84 is urged into engagement with the underside of the snap ring 44 by the biasing force of the spring member 80 to prevent the retainer-spring unit 80 from slipping off the bushing 12a.

Upon initial insertion of the bushing 12a through the mounting hole 38, the flange 86 of the retainer-spring unit 80 engages the back 58 of the support panel 40. Further axial movement of the bushing 12a relative to the retainer-spring unit 80 causes the snap ring 46 to become disengaged from the collar 84 so that it is free to move to its normally expanded position as described above. During mounting, the hook-like portions 92 of the spring members 88 are deflected downwardly (from the dashed-line position shown in FIG. 4) and provide the biasing force for holding the snap ring 46 in tight holding engagement with the front side 68 of the support panel 40.

In the embodiment illustrated in FIG. 4, the annular groove 87 in the bushing 12a is arranged to act as the centering means for the snap ring 46. More specifically, the groove 87 includes a tapered surface 96 which is outwardly inclined toward the outer end of the bushing 12a. After the snap ring 46 has been disengaged from the collar 84 of the retainer-spring unit 80 and starts to return toward its normally expanded position, the inner periphery of the snap ring is guided upwardly along the tapered surface 96 and automatically assumes a centered position.

In the alternate construction illustrated in FIGS. 5 and 6, a modified form of a combined retainer-sleeve unit is used. More specifically, a one-piece retainer-spring unit 100 is constructed from a relatively resilient material and includes a base portion 102 which is generally parallel to the top 20 of the switch frame 16. The base portion 102 has a central aperture 104 and a sleeve-like portion 106 extending integrally from the base portion 102 coaxially with the aperture 104 for slidably receiving the bushing 12b. The sleeve-like portion 106 has an outside diameter somewhat larger than the diameter of the support panel mounting hole 38. In the specific construction illustrated in FIGS. 5 and 6, the sleeve-like portion 106 is comprised of a plurality of axially extending fingers 108 which are circumferentially separated by notches 110; however, it can also have a continuous wall if desired.

Formed as an integral part of each of the opposite end portions of the base portion 102 is a pair of back-up spring members 112 (only one shown in FIGS. 5 and 6). Each of the spring members 112 includes a pair of outturned spring fingers 114 having an upper edge 116 adapted to abut the back 58 of the support panel 40 during mounting and an inturned, arcuate spring finger 118 adapted to abut the top 20 of the switch frame 16.

To assemble the switch ready for mounting from the rear of the support panel 40, the retainer-spring unit 100 is placed over the bushing 12b and pushed towards the switch frame 16. The spring fingers 118 bear against the top of the switch frame and flex sufficiently to permit the outer edges of the sleeve-forming fingers 108 to be moved past the annular bushing groove 120. The snap ring 122 is installed in the annular bushing groove 120 and compressed radially inwardly as described above. Upon releasing the retainer-spring unit 100, the biasing force of the spring fingers 118 moves the outer end portions of the sleeve-forming fingers 108 over the largest diameter of the snap ring 122 to releasably hold the snap ring in a compressed position within the bushing groove 120.

Similar to the embodiments illustrated in FIGS. 1–4, the outer end portion of each of the spring-forming fingers 108 can be provided on its inner surface with an offset portion 124 which together cooperate to serve the same function as the annular offset portion 64 described above, i.e., engage the underside of the snap ring 122 at the periphery to prevent the retainer-spring unit 100 from slipping off the bushing 12b. Alternately, each of the spring fingers 118 can be fastened to the switch frame by suitable means, such as by a spot weld, to prevent the retainer-spring unit 100 from slipping off the bushing 12b.

Upon initial insertion of the bushing 12b through the mounting hole 38, the upper or outer ends of the sleeve-forming fingers 108 engage the back 58 of the support panel 40. Further axial movement of the bushing relative to the retainer-spring unit 100 causes the snap ring 122 to become disengaged from the sleeve-forming fingers 108 so it is free to move toward its normally expanded position as described above. During mounting, the outturned spring fingers 122 are deflected downwardly and provide the biasing force for pulling the snap ring 122 in tight holding engagement with the front side 68 of the support panel 40.

In the embodiment illustrated in FIGS. 5 and 6, the snap ring 122 is arranged to be self-centering. For this purpose, the lower portion of the snap ring 122 is provided with an undercut portion having an inner axially extending wall 126 which, upon expansion of the snap ring towards its normally expanded position condition, abuts the inner wall of the mounting hole 38 as shown in FIG. 5 and thereby centers the snap ring within the mounting hole.

While different snap ring centering means have been shown and described in connection with each of the preferred embodiments illustrated in the drawing, it should be appreciated each of such means can be used with any of the constructions embodying the invention. The snap-in bushing can have a cross sectional form other than circular so long as the annular groove, the snap ring and retainer sleeve have complementary shapes. Also, actuators other than toggle levers can be used.

While preferred embodiments of the invention have been illustrated and described in detail, it will be apparent to those skilled in the art that various changes and modifications can be made thereto to adapt the invention to various uses without departing from the scope of the appended claims.

I claim:

1. A snap-in mounting assembly for a device adapting the device to be mounted from the back of and through an aperture in a support panel to secure the device thereto so that a part of the device is accessible from the front of the panel comprising
an elongated bushing carrying the accessible part of the device and having an outer end portion to be received in the support panel aperture, said bushing outer end portion including an annular groove;
a split ring disposed in said bushing groove, said ring being radially compressible and expandable in the plane thereof within said bushing groove between a normally expanded position where its outer dimension is larger than the inside dimension of the support panel aperture and a radially inwardly compressed position where it can pass through the support panel aperture;
retainer means mounted on said bushing for axial movement relative to said bushing, said retainer means having an outer end portion for releasably engaging and holding said ring in said compressed position and a portion adapted to abut the back of the support panel and limit axial movement of said retainer means relative to the support panel as said bushing outer portion is inserted through the support panel aperture during mounting, so that, upon continued axial movement of said bushing outer portion, said ring is disengaged from said retainer means and is free to return toward said expanded position where at least a portion thereof overlies the front of the support panel in the area surrounding the support panel aperture; and
means for urging said bushing in an axial direction away from the back of the support panel and thereby holding said ring in tight engagement against the front of the support panel and locking the device to the support panel.

2. A snap-in mounting assembly according to claim 1 including
means for centering said ring with respect to the support panel mounting aperture when said ring has expanded.

3. A snap-in mounting assembly according to claim 2 wherein
said centering means comprises a generally U-shaped spring, spacer member disposed in said bushing groove between the inner periphery of said ring and the inner wall of said bushing groove, said spacer member being arranged to evenly space said ring from said groove inner wall when said ring has expanded.

4. A snap-in mounting assembly according to claim 2 wherein said centering means comprises
said bushing groove having a tapered surface which is outwardly inclined in a direction towards the outer end of said bushing and is arranged to be engaged by the inner periphery of said ring and guide said ring to a centered position as said ring moves toward said expanded position.

5. A snap-in mounting assembly according to claim 2 wherein
said centering means comprises an annular undercut portion in the underside of said snap ring and having an axially extending shoulder which abuts the inner wall of the support panel aperture as said ring moves toward said expanded position.

6. A snap-in mounting assembly according to claim 1 wherein
the device is a toggle switch including a base housing switch contacts and a switch frame mounted on said switch base;
said bushing is mounted on and extends outwardly from said switch frame and pivotally supports a toggle lever for actuating said contacts;
said retainer means comprises a tubular sleeve slidably mounted on said bushing, having an outer end portion for encircling and releasably holding said ring in said compressed position, and having an outer edge adapted to abut the back of the support panel when said bushing is inserted through the support panel aperture during mounting; and
said biasing means comprises a spring having one end bearing against said sleeve and the other end bearing against said switch frame.

7. A snap-in mounting assembly according to claim 6 wherein
said outer end portion of said tubular sleeve includes an annular internal surface offset portion for receiving and releasably holding said ring in said compressed position, said offset portion having a radially extending shoulder which is urged into engagement with the underside of the periphery of said ring by said spring, thereby preventing said sleeve from slipping off said bushing prior to mounting on the support panel.

8. A snap-in mounting assembly according to claim 6 wherein
said sleeve has a first tubular portion including said outer edge and said offset portion, a second tubular portion spaced radially outwardly from said first tubular portion, and a radially extending flange integrally connecting said first and second tubular portions; and said spring is a coiled spring encircling said bushing and having a portion disposed between said second tubular portion and said bushing with one end bearing against said radially extending flange and the other end bearing against said switch frame.

9. A snap-in mounting assembly according to claim 1 wherein the device is a toggle switch having a base housing switch contacts and a switch frame mounted on said switch base;

said bushing is mounted on and extends outwardly from said switch frame and pivotally supports a toggle lever for actuating said contacts;

said retainer means includes an outer annular collar slidably mounted on said bushing for encircling and releasably holding said ring in said compressed position, said collar having an inner end and adapted to fit inside the support panel aperture, an inner tubular sleeve portion spaced radially outwardly from said collar and having outer and inner ends, and a radially extending flange integrally connecting said collar inner end and said sleeve portion outer end and adapted to abut the back of the support panel during mounting; and said biasing means comprises a pair of opposed, generally U-shaped spring members extending integrally from said sleeve portion inner end on opposite sides of said bushing, each of said spring members having an intermediate portion bearing against said switch frame and terminating in an outer end portion adapted to bear against the back of the support panel during mounting.

10. A snap-in mounting assembly according to claim 9 wherein said collar includes an internal surface annular offset portion in the outer end portion thereof for receiving and releasably holding said ring in said compressed position and having a radially extending shoulder which is urged into engagement with the underside of the periphery of said ring by the biasing force of said spring members, thereby preventing said retainer means from slipping off said bushing prior to mounting.

11. A snap-in mounting assembly according to claim 10 wherein said outer end portion of each of said spring members has a hook-like shape which is convex with respect to the back of the mounting panel.

12. A snap-in mounting assembly according to claim 1 wherein the device is a toggle switch having a base housing switch contacts and a switch frame mounted on said switch base;

said bushing is mounted on and extends outwardly from said switch frame and pivotally supports a toggle lever for actuating said contacts;

said retainer means includes a base portion generally parallel to said switch frame, having an aperture, and a sleeve-like portion extending outwardly from said base portion and about said aperture for slidably receiving said bushing; and said biasing means comprises a pair of outturned spring fingers and an inturned spring finger integrally formed in each of the opposite ends of said base portion, said downturned spring fingers bearing against said switch frame and said outturned spring fingers adapted to bear against the back of the support panel during mounting.

13. A snap-in mounting assembly according to claim 12 wherein said sleeve-like portion is comprised of a plurality of circumferentially spaced, axially extending fingers.

14. A snap-in mounting assembly according to claim 13 wherein each of said sleeve-forming fingers includes an internal surface offset portion, said offset portions cooperating to define an annular recess for receiving said ring in said compressed position and a radially extending shoulder which is urged into engagement with the underside of the periphery of said split ring by said inturned spring fingers, thereby preventing said retaining means from slipping off said bushing priot to mounting.

* * * * *